(12) United States Patent
Billson

(10) Patent No.: US 6,778,738 B1
(45) Date of Patent: Aug. 17, 2004

(54) DIGITAL PHOTOGRAPHIC REPRODUCTION APPARATUS

(75) Inventor: Duncan Robert Billson, Warwickshire (GB)

(73) Assignee: Dig-ePrint Limited, Coventry (GB)

( * ) Notice: Subject to any disclaimer, the term of this patent is extended or adjusted under 35 U.S.C. 154(b) by 188 days.

(21) Appl. No.: 10/129,638

(22) PCT Filed: Oct. 24, 2000

(86) PCT No.: PCT/GB00/04077

§ 371 (c)(1),
(2), (4) Date: May 7, 2002

(87) PCT Pub. No.: WO01/35633

PCT Pub. Date: May 17, 2001

(30) Foreign Application Priority Data

Nov. 9, 1999 (GB) .............................. 9926394

(51) Int. Cl.[7] .............................. G02B 6/26
(52) U.S. Cl. .............................. 385/43; 385/116
(58) Field of Search ................ 385/39–43, 115–120

(56) References Cited

U.S. PATENT DOCUMENTS

| | | | | |
|---|---|---|---|---|
| 4,763,975 A | * | 8/1988 | Scifres et al. | .............. 385/33 |
| 5,117,245 A | | 5/1992 | Gordon | |
| 5,799,126 A | * | 8/1998 | Nagatani et al. | ........ 385/146 |

FOREIGN PATENT DOCUMENTS

| | | |
|---|---|---|
| EP | 0 071 304 | 7/1982 |
| GB | 2 042 746 | 12/1979 |
| JP | 1011464 | 1/1989 |
| WO | 90/04194 | 4/1990 |
| WO | 90/04195 | 4/1990 |
| WO | 94/09391 | 4/1994 |
| WO | 97/42560 | 11/1997 |
| WO | 01/35633 | 5/2001 |

OTHER PUBLICATIONS

Search Report regarding corresponding Great Britain Application No. 9926394.9 dated Feb. 2, 2000.
International Preliminary Examination Report regarding International Application No. PCT/GB00/04077 mailed Feb. 6, 2002.
International Search Report regarding International Application No. PCT/GB00/04077 mailed Jan. 17, 2001.

* cited by examiner

*Primary Examiner*—Ellen E. Kim
(74) *Attorney, Agent, or Firm*—Renner, Otto, Boisselle & Sklar, LLP

(57) ABSTRACT

Digital photographic printing apparatus comprises a photographic paper carrier unit (1) for feeding a sheet of photographic paper past the writing head of an optical scanner unit (2). The writing head incorporates an array of light-emitting devices which are controlled by signals from a digital controller unit (3) holding successive sets of partial image data received from a digital image data unit (4). The writing head comprises a light pipe in the form of a solid fused bundle (10) of coherent optical fibers incorporating a tapered region (17) and having a light receiving face (13) and a light transmitting face (12) adjacent the sheet of photographic paper. An array of light-emitting or laser diodes (14) mounted on a printed circuit board (15) adjacent the light receiving face (13). When one or more of the diodes (14) is illuminated, the emitted light travels down the fibers of the optical fiber bundle (10) and is emitted from the output face (12) as indicated by the arrows (15), the diodes (14) appearing as though positioned closer together as a result of the reduction of the optical image due to the tapered region (17) of the optical fiber bundle (10). In this way the required optical resolution of the writing head is provided at relatively low cost.

13 Claims, 3 Drawing Sheets

DIGITAL PHOTOGRAPHIC REPRODUCTION APPARATUS

Figure 1:
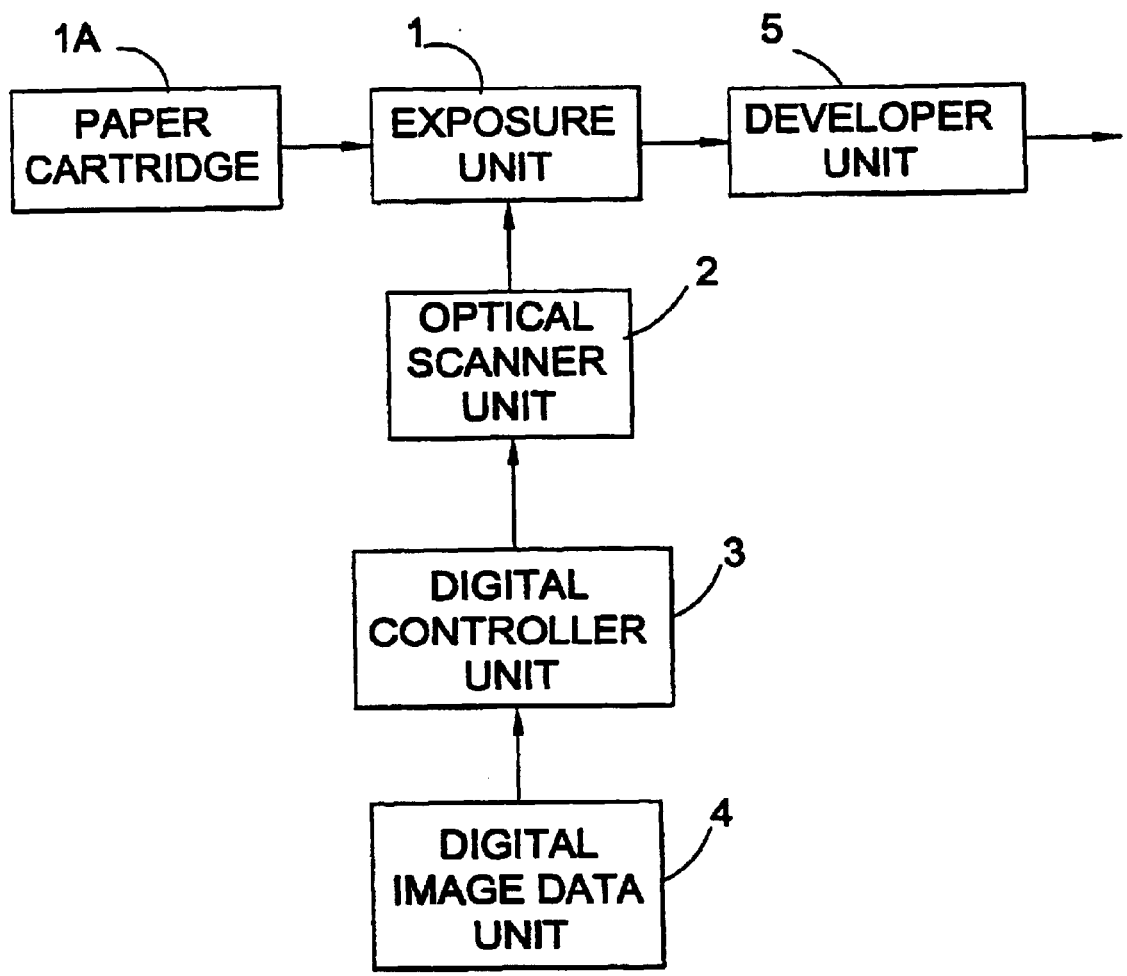

This invention relates to digital photographic reproduction apparatus for producing a photographic image from digital image data.

With the development of digital cameras which produce digital files representative of photographed images, there is an increasing need for equipment for direct reproduction of images on photographic paper utilising the digital files produced by such cameras.

Digital photographic printing systems for this purpose are available commercially and are known commonly as photographic paperwriters. However such systems are costly and this renders their use uneconomical in many photoprocessing outlets. One type of photographic paperwriter which is commercially available makes use of a lens system to focus laser beams modulated by the digital data onto standard photographic paper in order to produce photographic colour prints at a rate of up to a thousand 8×10 inch prints per hour. However such equipment is large, complex and very expensive.

GB 2042746A discloses a multiple variable light source for a photographic printer incorporating an array of light-emitting diodes and a respective optical fibre associated with each light-emitting diode for conducting light from the diode towards the surface of a photoconductive drum. However such an arrangement suffers from the disadvantage that each individual fibre must have its end correctly aligned with respect to the associated light-emitting diode if acceptable photographic quality is to be achieved. Similar types of fibre optical array, suffering from the same disadvantage, are disclosed in WO 90/04194 and WO 90/04195.

It is an object of the invention to provide digital photographic reproduction apparatus which is capable of being produced at relatively low cost and of being used in such an application.

According to the present invention there is provided digital photographic reproduction apparatus for producing a photographic image from digital image data, the apparatus comprising carrier means for receiving a suitable photographic image carrier medium, an optical light pipe having a light receiving face at one end and a light transmitting face at an opposite end arranged to lie adjacent to the carrier medium, an array of light-emitting devices arranged adjacent the light receiving face of the light pipe, and digital control means for controlling the light-emitting devices so as to supply, in response to digital image data, optical writing signals which are transmitted along the light pipe to the carrier medium to produce a photographic image on the carrier medium, wherein the light pipe comprises a solid coherent bundle of optical fibres which is tapered in a region between the light receiving face and the light transmitting face so that the light receiving face has a substantially greater surface area than the light transmitting face to thereby increase the optical resolution of the photographic image.

Such digital photographic reproduction apparatus can be produced at much lower cost than currently commercially available systems, and can rapidly and accurately expose photographic paper to a digitally controlled image with a high degree of resolution, that is with a spot size of the order of 1/200 to 1/800 of an inch (120 to 30 µm).

It should be understood that the terms "optical" and "light" as used in this specification are not intended to be limited simply to electromagnetic radiation in the visible part of the spectrum, and these terms are also to be considered as embracing within their scope electromagnetic radiation outside the visible part of the spectrum, such as infrared or ultraviolet light.

Figure 2:
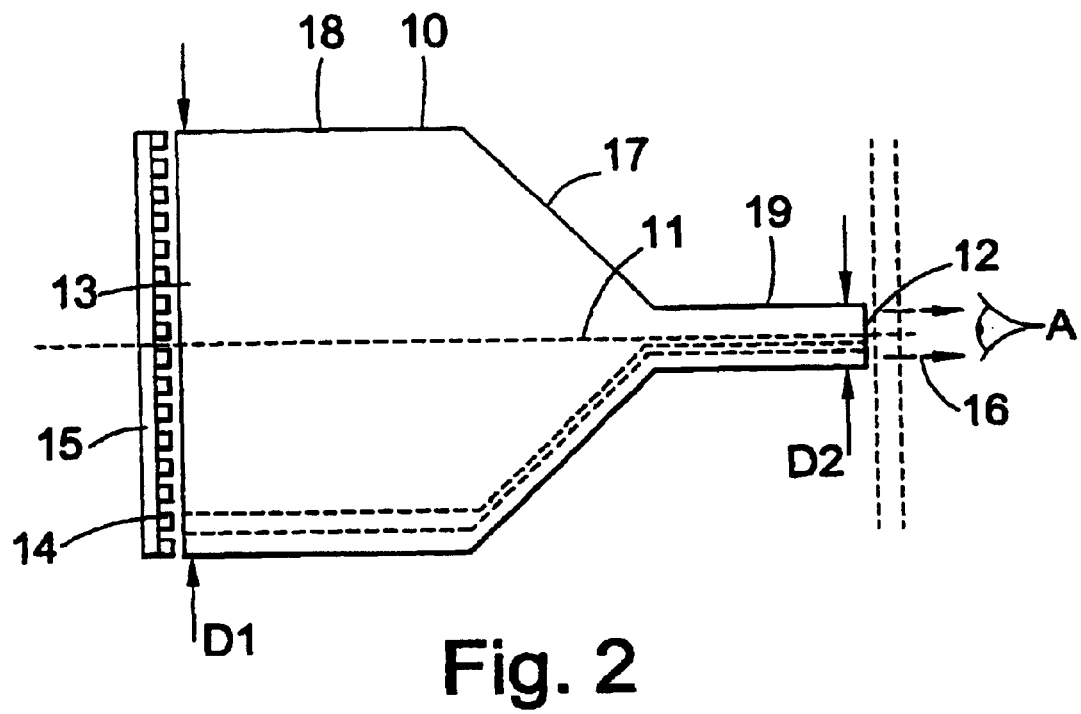

In order that the invention may be more fully understood, a preferred embodiment of digital photographic reproduction apparatus in accordance with the invention will now be described, by way of example, with reference to the accompanying drawings, in which:

FIG. 1 is a schematic diagram of such apparatus;

FIG. 2 presents schematic views from one side of a light pipe used in such apparatus; and FIGS. 3, 4, 5, 6 and 7 are explanatory diagrams.

The digital photographic printing apparatus shown diagrammatically in FIG. 1 comprises a photographic paper exposure unit 1 for receiving a sheet of photographic paper from a paper cartridge 1A and for feeding the sheet past the writing head of an optical scanner unit 2. The writing head incorporates an array of light-emitting devices which are controlled by signals from a digital controller unit 3 which incorporates sample and hold circuitry for holding successive sets of partial image data received from a digital image data unit 4 and for controlling the light-emitting devices during successive time periods to build up the photographic image a part at a time. In this way, as the sheet is moved past the optical scanner unit 2 by the carrier unit 1, successive portions of the sheet are optically exposed to the writing head and to an optical image determined by the control of the light-emitting devices by the digital controller unit 3 in accordance with the applied digital image data. After such exposure the sheet is passed to a developer unit 5 within which developing is effected by a wet development process prior to the developed sheet being outputted by the apparatus.

Although the developer unit is preferably an integral part of the apparatus to which the sheet is automatically supplied by the carrier unit 1 after exposure, it would also be possible for the developer unit to form a separate item of apparatus to which the sheet is manually transferred by the user after exposure. Furthermore it is preferred that the apparatus is based around existing bubble-jet printer technology with the ink cartridge and the printing head being replaced by an optical writing head so that raster scanning of the photographic paper sheet occurs as the sheet is moved stepwise in a direction transverse to the direction along which the optical writing head is moved along each line. Alternatively such raster scanning could be performed by an arrangement in which the sheet is held stationary on the carrier platen whilst the optical writing head is scanned over the sheet a line at a time with the writing head being displaced, between writing of each line, by one step transversely of the line.

In accordance with the invention the optical writing head of such digital photographic printing apparatus comprises a light pipe in the form of a solid fused bundle 10 of coherent optical fibres having a central optical axis 11, as shown diagrammatically from the side in FIG. 2. A light transmitting face 12 of the optical fibre bundle 10 is cut and polished normal to the axis 11, and a light receiving face 13 of the optical fibre bundle 10 is also cut and polished normal to the axis 11. The optical fibre bundle 10 incorporates a tapered region 17 in which the individual optical fibres have been drawn so as to progressively decrease their diameters, as well as an untapered input region 18 in which the optical fibres are of a constant maximum diameter and an untapered output region 19 in which the optical fibres are of a constant minimum diameter. Furthermore an array of light-emitting or laser diodes 14 is attached to a printed circuit board 15 positioned adjacent to, and extending parallel to, the light receiving face 13 of the optical fibre bundle 10 such that good light transmission between the diodes 14 and the optical fibre bundle 10 is achieved.

Figure 3:
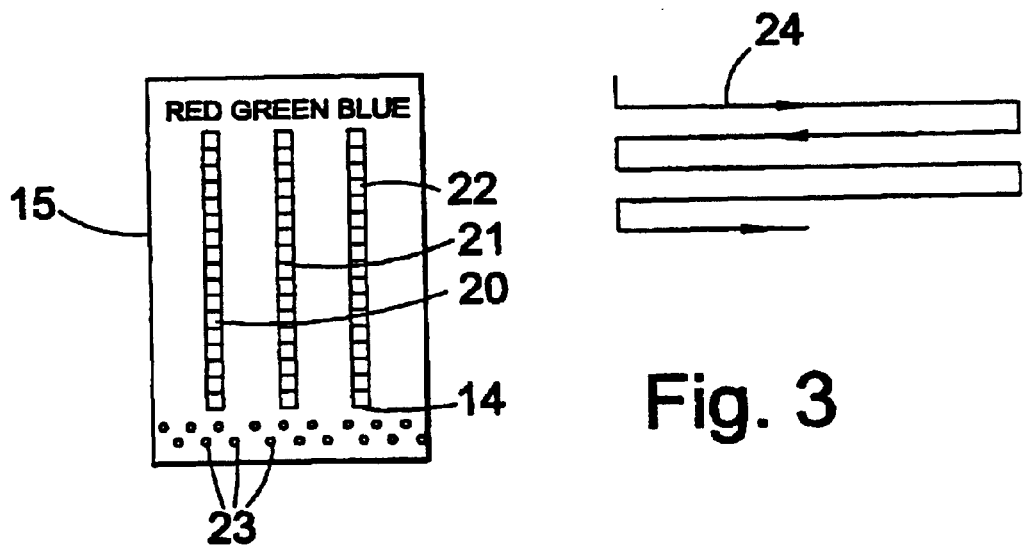
Figure 4:
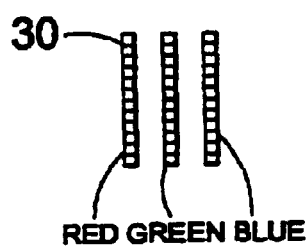

The array of light-emitting or laser diodes 14 comprises three linear arrays, that is an array 20 of red diodes 14, an array 21 of green diodes 14, and an array 22 of blue diodes 14, mounted side-by-side on the printed circuit board 15, as shown from the front in the diagram of FIG. 3. However it should be noted that any number of linear arrays may be used in such an optical writing head, and that colours other than red, green and blue may be used in these arrays. The colours (or spectra) of the particular light-emitting diodes used will have to be chosen for the particular photographic paper used. Also shown in FIG. 3 are the electrical connectors 23 by means of which the switching signals are supplied to the three arrays 20, 21, 22 by the digital controller unit. When one or more of the diodes 14 is illuminated, the emitted light travels down the fibres of the optical fibre bundle 10 and is emitted from the light transmitting face 12 as indicated by the arrows 16. It will be appreciated that, when the light transmitting face 12 is viewed from A, the diodes 14 of the array adjacent the light receiving face 13 of the optical bundle 10 appear as though positioned closer together so that, when all the diodes are illuminated, an array of light spots 30 is seen, as shown in the diagrammatic end view of the light transmitting face 12 of FIG. 4.

This shows an apparent compression of the light spots 30 in both x and y directions as a result of the reduction of the optical image applied to the light receiving face 13 of the optical fibre bundle 10 due to the tapered region 17. The image reduction can be expressed as a ratio D1: D2 where D1 is the diameter of the light receiving face 13 and D2 is the diameter of the light transmitting face 12 of the optical fibre bundle 10. Calculations show that, in order to produce light spots having a desired resolution (spot size) of 60 $\mu$m with an array of diodes 14 spaced apart by 0.3 mm, it is necessary for the tapered region 17 to produce a 5:1 image reduction. Greater resolution can be achieved by reducing the spacing of the diodes 14 or by increasing the reduction ratio of the tapered region 17. If the coupling efficiency of light from the diodes 14 into the optical fibre bundle 10 is of the order of 7%, the light output of the optical fibre bundle 10 is sufficient to expose photographic paper at an acceptable rate.

As previously indicated, for a full colour image, three parallel linear arrays 20, 21 and 22 of diodes 14 are positioned adjacent the light receiving face 13 of the optical fibre bundle 10, the three linear arrays being placed next to each other on a single optical fibre bundle, and the three arrays of diodes being controlled with appropriate electronic delays during raster scanning so as to align the red, green and blue images, in a manner similar to that used in conventional bubble-jet printers. The raster scanning of the photographic paper by the optical writing head normal to the linear arrays 20, 21, 22 is shown diagrammatically at 24 in FIG. 3. In an alternative embodiment raster scanning occurs along a direction which is not normal to the linear arrays, but which extends along at a non-normal angle, for example 45°, to the linear arrays.

If required the optical fibre bundle 10 may include interstitial material between the individual optical fibres so as to reduce inter-element optical crosstalk. Furthermore it may be advantageous for the diameter of the optical fibres at the light receiving face 13 (the maximum optical fibre diameter) to be chosen to be less than one quarter of the size of the light-emitting diodes in order to reduce speckle noise in the final image Whilst other types of light-emitting device can be used in the optical writing head, it is considered that light emitting diodes are particularly suitable for this application since they are relatively inexpensive, are efficient at converting electrical energy into coloured light, can be switched very rapidly and are easily fabricated into small linear arrays. Furthermore they can be chosen to have output wavelengths which are particularly desirable in this application. Colour filters may be added (either as discrete elements, or in the form of a dye added to the LED encapsulant) to modify the spectral output from the light-emitting diodes. Because of the reduction in size of the image, the precise alignment of the diodes on the printed circuit board is not critical, and this is a significant factor in simplifying the manufacturing process.

Figure 5:
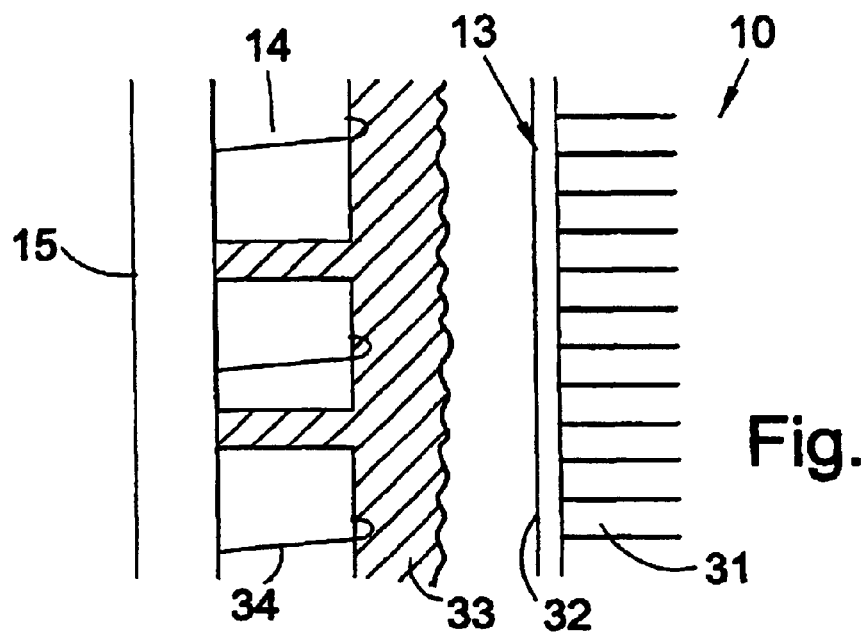

FIG. 5 shows a portion of the light receiving face 13 of the optical fibre bundle 10 on an enlarged scale, showing in particular the positioning of the light-emitting diodes 14 relative to the ends 31 of the individual optical fibres at the light receiving face 13. It will be appreciated that the light coupling of the light-emitting diodes 14 to the ends 31 of the optical fibres will fundamentally affect the performance of the optical writing head. To this end an anti-reflection coating 32 may be applied to the light receiving face 13 in order to reduce reflection losses. In addition to or instead of such a coating 32, an anti-reflection coating may be applied to the light transmitting face 12 of the optical fibre bundle 10. Also shown in FIG. 5 is a transparent encapsulating layer 33 which is applied to the face of the printed circuit board 15 on which the light-emitting diodes 14 are mounted in order to protect the fragile connecting wires 34 of the diodes. The presence of the encapsulating layer 33 means that there must be a finite spacing between the diodes 14 and the light receiving face 13 of the fibre optic bundle 10.

Figure 6:
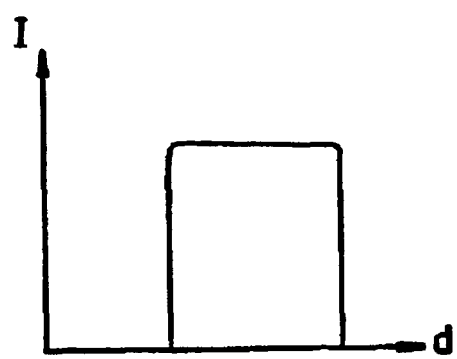
Figure 7:
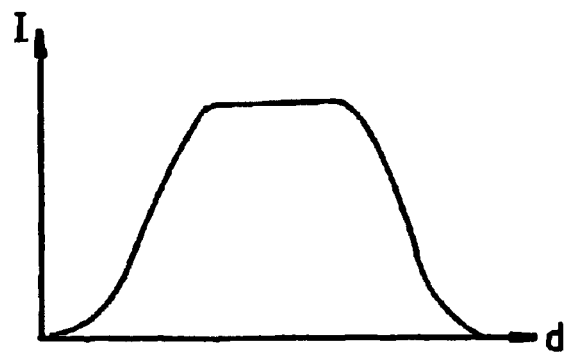

Furthermore, in order to make the optical image more pleasing to the eye, it is desirable to arrange for the light coupling to be such that the image spots do not have a square intensity profile as shown in FIG. 6, where I represents the light intensity and d represents the distance of each point along a line from a reference point outside the light spot. Instead it is desirable for the image spots to have an intensity profile as shown in FIG. 7 in which the intensity falls off gradually at the edges of each spot. Such smoothing can be controlled by accurately maintaining the distance between the diodes and the light receiving face 13 over the whole area of the light receiving face 13. Accurate control of this distance will allow sufficient light from each diode to fall on the surrounding optical fibres so as to reduce the desired degree of light spreading in its image on the photographic paper.

In order to provide increased power and/or in order to reduce the light spot size, it might be advantageous in some applications to provide a light source other than light-emitting or laser diodes, such as a white light source and an associated liquid crystal light modulator. Since the power output determines the speed at which light exposure of the sheet can be effected, particular attention must be paid to providing a light source of adequate power output. It may also be appropriate in certain applications to provide optical signal processing so that the illumination of the diodes is controlled in such a manner as to compensate for scanning inhomogeneities and/or differences in light responsiveness.

With the proposed optical writing head and scanning mechanisms, the image printed onto the photographic paper would consist of a square array of dots. However, in an alternative arrangement, the dots formed along alternate print lines may be shifted by one half of the dot spacing with the result that a hexagonal array of dots is produced. Such a hexagonal array allows the dots to pack together with a smaller gap or overlap area than with the square array so that, for the same size of dot, the resolution and number of dots per unit area can be increased. The required shifting between alternate lines may be achieved by shifting the head under the control of a piezoelectric crystal.

It is also possible to make use of temporal dithering to control the brightness of the light sources. In such a technique, rather than the light source being illuminated continuously during a required activation period, the light source is controlled so as to be turned rapidly on and off at a frequency and with an on/off ratio such that the required brightness is obtained over the activation period. In this manner the brightness of the red, green and blue components of the colour image may be varied relative to one another to redistribute the quantisation noise. This technique can also be used to prevent the occurrence of Moiré patterns in the image due to beat frequencies between superimposed patterns. Further reduction in Moire and quantisation noise patterns may be achieved by dithering the dot position by applying a random signal to the piezoelectric crystal used to control shifting between alternate lines in production of the hexagonal array as described above.

It should be appreciated that the above description of digital photographic printing apparatus is given only by way of example, and that the optical transducer in accordance with the invention may be used in a variety of applications for writing (and optionally also reading) of data on a suitable data carrier medium. The light sources may or may not be formed by diode arrays, and the light compression may be effected using a single fibre optic bundle, or alternatively using two fibre optic bundles in sequence for compression in two directions transverse to one another. One possible further application is reading/writing onto compact disks using a large number of heads in order to speed up the reading/writing process. Furthermore the apparatus is also suitable for the production of photographic negatives or transparencies from digital data image data in which case a photographic image may be produced at a higher resolution than in a photographic print.

What is claimed is:

1. Digital photographic reproduction apparatus for producing a photographic image from digital image data, the apparatus comprising carrier means (1) for receiving a suitable photographic image carrier medium, an optical light pipe (10) having a light receiving face (13) at one end and a light transmitting face (12) at an opposite end arranged to lie adjacent to the carrier medium, an array of light-emitting devices (14) arranged adjacent the light receiving face (13) of the light pipe (10), and digital control means (3) for controlling the light-emitting devices (14) so as to supply, in response to digital image data, optical writing signals which are transmitted along the light pipe (10) to the carrier medium to produce a photographic image on the carrier medium, characterized in that the light pipe (10) comprises a solid coherent bundle of optical fibres which is tapered in a region (17) between the light receiving face (13) and the light transmitting face (12) so that the light receiving face (13) has a substantially greater surface area than the light transmitting face (12) to thereby increase the optical resolution of the photographic image.

2. Apparatus according to claim 1, wherein the optical fibre bundle (10) has a region (18, 19) in which it is not tapered which lies between the tapered region (17) and one of the light receiving face (13) and the light transmitting face (12).

3. Apparatus according to claim 2, wherein the optical fibre bundle (10) has a region (18) in which it is not tapered between the tapered region (17) and the light receiving face (13) and a further region (19) in which it is not tapered between the tapered region (17) and the light transmitting face (12).

4. An apparatus according to claim 1, wherein the light-emitting devices comprise three linear arrays of light-emitting devices for emitting optical writing signals of three different colours suitable for producing a colour image on the carrier medium.

5. An apparatus according to claim 1, wherein the light-emitting devices are attached to a printer circuit board extending parallel to the light receiving face of the optical fibre bundle.

6. Apparatus according to claim 1, wherein the light-emitting devices are spaced a predetermined constant distance from the light receiving face of the optical fibre bundle in order to control the spread of the light from the devices falling on the light-receiving face.

7. Apparatus according to claim 1, wherein an anti-reflection coating is applied to one of the light receiving face and light transmitting face of the optical fibre bundle to limit reflection losses.

8. Apparatus according to claim 1, wherein the optical fibre bundle is tapered along the mutually transverse planes between the light receiving face and the light transmitting face.

9. Apparatus according to claim 1, which is adapted to produce a photographic image with a resolution in the range of 10 to 150 μm and preferably between 30 and 80 μm.

10. Apparatus according to claim 1, wherein the digital control means incorporates sample and hold means for holding successive sets of partial image data and for controlling the light-emitting devices during successive time periods in dependence on said sets of data so as to build up the photographic image a part at a time.

11. Apparatus according to claim 1, wherein scanning means is provided for producing the photographic image by scanning of the carrier medium by the optical writing signals supplied along the light pipe.

12. Apparatus according to claim 11, wherein the scanning means (2) is adapted to move the carrier medium through the apparatus in one direction during application of the photographic image to the carrier medium by repeated movement of the light pipe (10) relative to the carrier medium transversely of said one direction.

13. Apparatus according to claim 1, wherein developing means is provided for chemically developing the photographic image applied to the carrier medium.

* * * * *